United States Patent [19]
Bonsack et al.

[11] Patent Number: 4,652,434
[45] Date of Patent: Mar. 24, 1987

[54] CHLORINATION OF ORES CONTAINING ALKALI OR ALKALINE EARTH VALUES

[75] Inventors: James P. Bonsack, Aberdeen, Md.; Michael Robinson, Wooton, England

[73] Assignee: SCM Corporation, New York, N.Y.

[21] Appl. No.: 762,213

[22] Filed: Aug. 5, 1985

[51] Int. Cl.$^4$ ............................................. C01F 5/30
[52] U.S. Cl. .................................... 423/155; 423/72; 423/79; 423/84; 423/137; 423/494; 423/496; 423/497; 423/499; 75/1 R
[58] Field of Search ................. 423/60, 155, 163, 463, 423/504, 497, 499, 84, 72, 79, 191, 63, 197; 75/1 R; 422/139

[56] References Cited

U.S. PATENT DOCUMENTS

| | | | |
|---|---|---|---|
| 2,985,507 | 5/1961 | Wienert | 423/60 |
| 3,050,362 | 8/1962 | Oppegaard et al. | 423/155 |
| 3,473,916 | 10/1969 | Severns, Jr. | 423/60 |
| 3,729,544 | 4/1973 | Svanstrom | 423/60 |
| 3,903,238 | 9/1975 | Grinder et al. | 423/60 |
| 3,977,862 | 8/1976 | Glaeser | 423/79 |
| 4,066,424 | 1/1978 | Kilgren et al. | 55/71 |
| 4,182,747 | 1/1980 | Gravey et al. | 423/60 |
| 4,220,629 | 9/1980 | Wyndham et al. | 423/60 |
| 4,343,775 | 8/1982 | Bonsack | 423/79 |
| 4,440,730 | 4/1984 | Bonsack | 423/74 |
| 4,442,075 | 4/1984 | Rado | 423/79 |
| 4,442,076 | 4/1984 | Bonsack | 423/79 |
| 4,487,747 | 12/1984 | Robinson et al. | 423/60 |
| 4,519,987 | 5/1985 | Robinson | 423/60 |
| 4,521,384 | 6/1985 | Hartmann et al. | 423/72 |
| 4,540,551 | 9/1985 | Bonsack et al. | 423/79 |

Primary Examiner—Andrew H. Metz
Assistant Examiner—Anthony McFarlane
Attorney, Agent, or Firm—R. A. Sturges

[57] ABSTRACT

The invention pertains to an entrained-downflow chlorination process of fine metalliferous ores particularly containing alkali and/or alkaline earth metals greater than about 0.3% by weight as the oxide. The process includes a quenching step following the chlorination step where the chlorinated products are quenched by liquid cooling fluid spray patterns adapted to prevent solidification of the alkali and/or alkaline earth materials onto the reactor walls. The chlorinator unit of this invention prevents disruption of the chlorination process due to presence of liquids or sticky particles and it contains a quenching spray means disposed below the chlorination zone in the entrained-downflow chlorinator unit, whereby the quenching sprays prevent reactor wall buildup.

19 Claims, 8 Drawing Figures

CHLORINATION OF ORES CONTAINING ALKALI OR ALKALINE EARTH VALUES

This invention relates to chlorination of fine metalliferous ores and particularly those ores containing a minor amount of alkali and/or alkaline earth materials. Alkali metals include Li, Na, K, and alkaline earh metals include Mg, Ca, Sr, Ba.

Suitable metalliferous ores that can be chlorinated in accordance with this invention include for instance chromite ores, tantalite ores, columbite ores, wolframite ores, bauxite ores and similar ores or combination of ores. Particularly suitable are titanium-bearing ores such as perovskite, smelted ilmenite (slag), rutile ore or ilmenite ores. Such ores can be advantageously processed in accordance with the chlorination process of this invention without undesirable molten or sticky alkali or alkaline earth chlorides disrupting the chlorination processes. For instance, sticky or fluid chlorides typically can cause defluidization in a fluidized-bed chlorination process. When a fluid bed contains only a relatively small amount of liquid, the bed will defluidize and the liquid coats the particles in the bed causing them to stick together into clumps that are too large to fluidize.

Fluid-bed reactors, which are the preferred reactor type for chlorination operations, cannot be used for chlorination of such materials containing appreciable amounts of Ca or Mg or other alkali or alkaline earth material. CaO and MgO are the oxides most frequently found in natural ores and minerals. Fluid-bed chlorination processes operate in the typical temperature range of 800°–1100° C. where Ca and Mg exist as liquid chlorides. Alkali and alkaline earth metal oxides are readily chlorinated by $Cl_2$ in the presence of carbon and other metal oxides where alkali and alkaline earths will tend to chlorinate first. Alkali chlorides have melting points that range from 614° C. (LiCl) to 801° C. (NaCl). Alkaline earth chlorides (neglecting $BeCl_2$) have melting points that range from 714° C. ($MgCl_2$) to 963° C. ($BaCl_2$). Boiling points range from 1250° C. ($SrCl_2$) to 1835 ($CaCl_2$). When metal values include Ca and Mg, liquid chlorides that are stable in the temperature range 714° to 1385° C. will form when these metal values are recovered by chlorination methods.

The amount of alkali or alkaline earth that can be tolerated in a feedstock for fluid-bed operations will, of course, depend on operating conditions. However, under the moxt favorable conditions, the frequently encountered alkaline earth, Ca, will eventually cause defluidization problems when present in amounts above about 0.3 wt % CaO in a feedstock. Although bed purging can be used, this is not desirable if the CaO content exceeds around 0.3%. Furthermore, fine materials (less than about 100 microns or through a 140 mesh screen) cannot be chlorinated in a fluid bed since fines tend to blow out of the reactor unreacted, except at a very low $Cl_2$ gas velocity through the bed which tends to make the chlorinating operation uneconomical. Hence, fluidized-bed chlorinators cannot be used for chlorinating ores containing minor amounts of alkaline or alkaline earth oxide materials. Such ores containing excess fine particles, and particulary containing undesirable alkali and/or alkaline earth oxides which form sticky fluid chlorides and cause bed defluidization, are particularly suitable feedstocks for the present process.

Still a further problem can develop when operating a fluid bed with tolerable low levels of impurities such as Ca, Mg, Mn and Fe where inevitable cooling of the offgas occurs between the chlorination zone and the quench zone. The offgas duct between the reactor and the quench (cooling) point tends to plug. Quenching hot chlorinator offgas in the relatively small diameter discharge duct downstream of the chlorinator has been found to be difficult in actual practice due to inevitable cooling of the offgas between the chlorination zone and the quench zone. As a result, liquid droplets of alkali/alkaline earth chlorides impinge on the relatively cool duct walls causing such chlorides to freeze which builds up into a layer and chokes-off the passage of offgas. Also, condensable metal chloride vapors such as $FeCl_2$ and $MnCl_2$ tend to deposit on cool duct walls as liquids and likewise eventually freeze.

Placing the cooling quench inside the top of a fluid-bed chlorinator has not been successful, presumably because such a spray knocks out the cloud of dust that exists in the space above the fluid bed, which insulates the bed from heat loss to some extent, and renders its operating uneconomical. When such a spray is used, the heat demand of the fluid bed rises very markedly.

U.S. Pat. No. 4,487,747 suggest one way that the bed sticking problem in a fluid bed may be overcome in certain instances. Such a solution does not lend itself to chlorination of minerals containing a significantly large CaO/MgO fraction or to fine minerals.

It now has been found that ores containing fine particles and/or alkali and/or alkaline earth metals can be chlorinated in an entrained-downflow chlorination process without disrupting the chlorination process or plugging the off gas duct between the reactor and subsequent cooling points in the process. In accordance with the process of this invention, fine ores containing alkali and alkaline earths are chlorinated in an entrained-downflow chlorinator wherein the body of the vessel contains in its discharge end (bottom) a quench (cooling) zone. In the cooling zone, small droplets of sticky molten alkali and alkaline earth chlorides are cooled to below their melting point to convert them into dusty solid particles, which are carried out of the reactor by chlorinator offgas.

In the upper chlorinating zone, the walls are kept above the melting point of the alkali/alkaline earth chlorides by the exothermic chlorination reaction. In the present process, the droplets are quenched in a quench zone immediately below the chlorination zone. The cooling quench can be done by a spray of cold liquid. Although not required, chlorinated product can be used as a cooling liquid. For instance, $TiCl_4$ can be the cooling liquid when titaniferous ore is chlorinated or a spray of cold liquid $SnCl_4$ can be used when a tin ore is chlorinated. Similar sprays can be used depending on the ore being processed although the cooling spray need not be the desired product chloride.

Some metal chlorides, e.g. $AlCl_3$ or $SnCl_4$ are conventionally made by chlorination of their metals, but these can be considered to be included for the present purposes with metal chlorides such as $SiCl_4$ and $TiCl_4$ conventionally made by chlorination of their oxidic ores. In conventional chlorination processes, chlorination of sandy ores in a fluid bed, ores containing alkali or alkaline earth values must be avoided or must be pretreated by acid leaching for example to remove such values prior to chlorination. Otherwise, the chlorides of these materials are sticky at operating temperature (about 1000° C.) and interfere with the operation of the process. Acid leaching pretreatment is expensive. Avoidance of such ores precludes the economic production of some materials, e.g. SnCl4. The present inventionovercomes these processing problems and is advantageously useful for processing aluminum and tin ores in accordance with the process of this invention.

The present process solves the above-mentioned problems. Technically, an upper limit for alkali or alkaline earths in feedstocks is not apparent, a lower limit for feedstock particle size is not apparent and extreme fineness is beneficial. Fine particles provide more exposed surface area and chlorination rates are therefore higher, which means that smaller reactors can be used. Stickiness within the particles leaving the chlorination zone and the cooling zone is eliminated by placing the cooling zone in the bottom section of an entrained-downflow type chlorinator. These and other advantages wil become more apparent by referring to the drawings, the detailed description of the invention and the illustrative examples.

SUMMARY OF THE INVENTION

Briefly, the invention relates to the use of entrained-downflow chlorination of fine metalliferous ores, particularly those ores containing alkali and alkaline earth values in amounts greater than 0.3% by weight (expressed as the oxide), these being the desired values or merely impurity values, which can be processed without disruption by the use of a sudden cooling zone within the chlorination vessel prior to the discharge from the chlorination vessel. The sudden cooling or quench zone freezes the sticky molten alkaline and alkaline earth chlorides to below their melting point, whereby the solid chlorides can be freely discharged from chlorinator reactor.

In a preferred embodiment, introducing a cooling spray of a liquid product chloride, for example TiCl4 or SnCl4, into the entrained-downflow chlorinator suddenly cools the product chloride vapors to below the melting temperature of the alkali and alkaline earth chlorides without contaminating the product chloride. The quenching liquid for the cooling spray need not be the desired product chloride itself, but is preferred. The present invention allows the use of certain ores and some processed ores hitherto avoided, including ores containing above 0.3% by weight alkali or alkaline earth oxides, fine and moderately fine magnesia bearing ilmenites, fine calciferous titania slags, fine calciferous tin ores, and perovskite, as well as other difficult to process ores due to inordinate amounts of alkali and alkaline earth values.

IN THE DRAWINGS

DETAILED DESCRIPTION OF THE INVENTION

Figure 1:
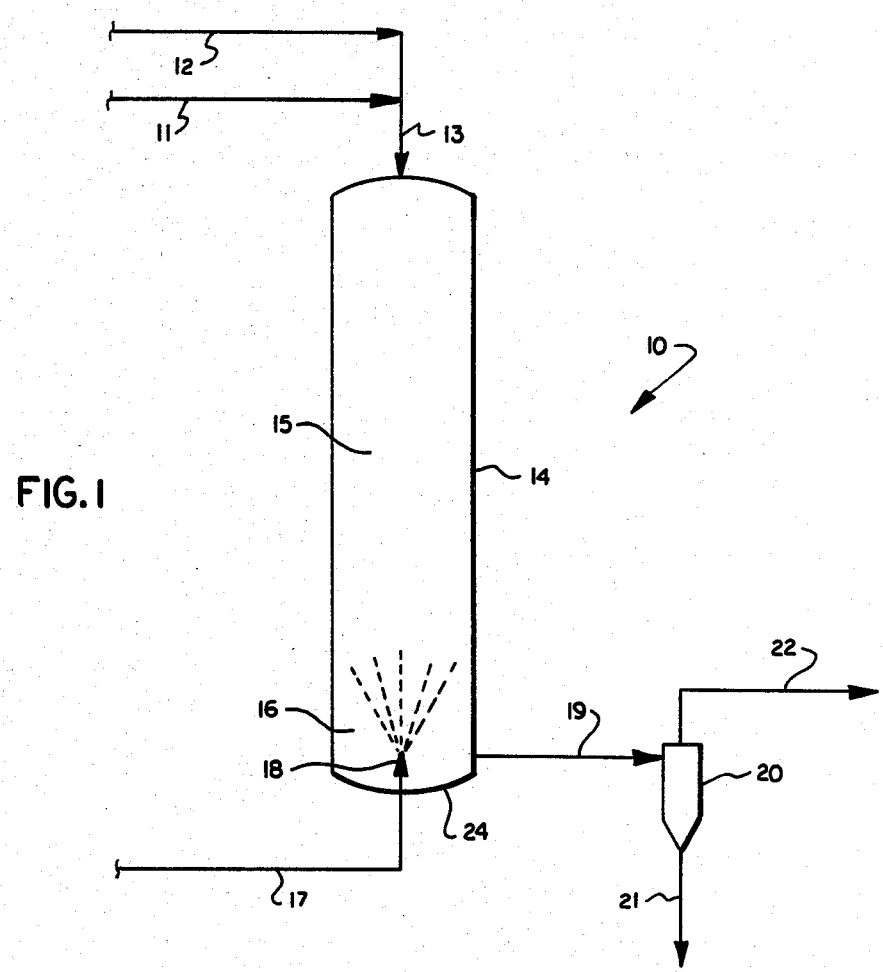
FIG. 1 is a unit operations diagram illustrating a downflow chlorinator including a bottom quenching unit or zone in accordance with this invention.

Referring first to the drawings wherein like characters designate like parts, shown generally is an entrained-downflow chlorinator 10 comprising an entrained-flow reactor unit 14 containing an upper chlorination reation zone 15 and a lower quench zone 16. The reactor unit 14 is a refractory lined steel vessel having a refractory covered domed top and dished bottom 24. A feed stream 13 entering the top of the reactor 14 comprises fine solids dispersed in chlorine derived from mixing a chlorine gas feed 12 with a slag (ore) and carbon feed 11. The feed stream 13 enters the top of the reactor 14 and is spray discharged within the uppermost top portion of the entrained flow reactor 14.

Inside the reactor 14, powder ore and carbon dispersed within chlorine gas are sprayed downwardly with the reaction zone 15 to produce a down-flow chlorination reaction process wherein powdered carbon reductant and ore are entrained in a stream of down-flowing chlorine gas. The chlorination reaction of oxide materials in the ores proceed substantially to completion as the ore and carbon particles fall downwardly through the reaction zone 15. The down-flowing feed solids of ore and carbon within the reaction zone 15 typically can be maintained at a concentration of about 0.01 lbs./cu. ft. to about 0.20 lbs./cu. ft. and preferably less than about 0.06 lbs./cu. ft. at reaction temperatures. The chlorine gas source can be chlorine gas, ferric chloride vapor, an organochloride, or a mixture thereof. $FeCl_3$ vapor dissociates above 800° C. to $FeCl_2$ and $Cl_2$. Chlorine gas is preferred and can comprise fresh chlorine or include recycled chlorine. The chlorination reaction and reaction zone ordinarily are maintained at temperatures above about 800° C. and typically around 1000° C. to 1100° C. or higher. The reaction heat ordinarily can be maintained by exothermic chemical reactions occurring during the chlorination stage whereby the entering feed 13 of oxide containing materials are chlorinated to produce chlorination products.

The descending chlorination products including alkali and alkaline earth chlorides along with other metal chlorides continue downwardly from the reaction zone 15 into a quenching zone 16 located at the bottom of the reactor 14. Chloride product particles entering the quenching zone 16 are rapidly cooled by liquid cooling fluid 17 entering the bottom of the reactor 14 and sprayed vertically upward through upwardly directed nozzle(s) 18. The spray angle is not critical but desirably is between about 15° and 110° and preferably between 30° and 90°. The quenching zone 16 preferably comprises between about 10% to 30% of the total inside height of the reactor 14 depending on the height and diameter of the reactor 14. The cooling fluid can be vaporous or preferably liquid.

Chlorinated products including quenched alkali or alkaline earth chlorides along with other chlorides emerge from the bottom of the reactor 14 by exit stream 19 and are conveyed to cyclone 20. In cyclone 20, solid chloride products are separated from gaseous products where solid products are withdrawn by a bottom stream 21 and vaporous products are removed by overhead gaseous stream 22. The gas steam 22 can be condensed and separated to produce desired chloride product which can be purified and further reacted or partially recycled, if desired, in an unpurified state to liquid cooling stream 17.

Figure 1A:
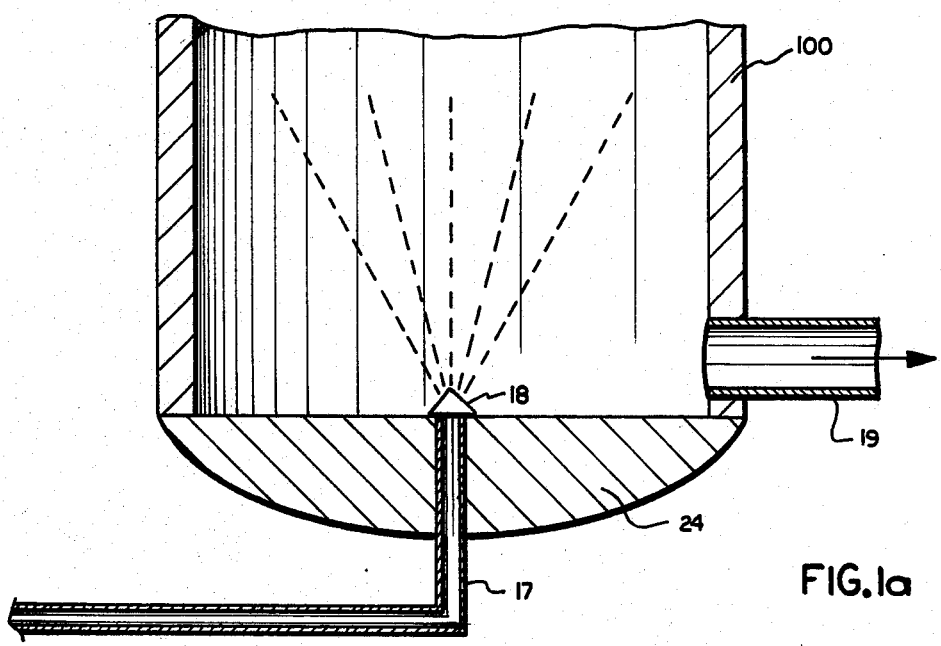
FIG. 1a is an enlarged vertical section view of the bottom quenching zone shown in FIG. 1.

Referring next to FIG. 1a, shown is an enlarged vertical section view of the bottom quench zone 16 having a nozzle 18 mounted on the refractory bottom 24 floor of the reactor 14. Liquid coolant is fed under pressure through coolant feed line 17 at a pressure sufficient to provide adequate spray patterns and typically can be between 20 and 100 pounds per square inch. A single nozzle 18 can be used or a plurality of nozzles can be used.

Figure 2:
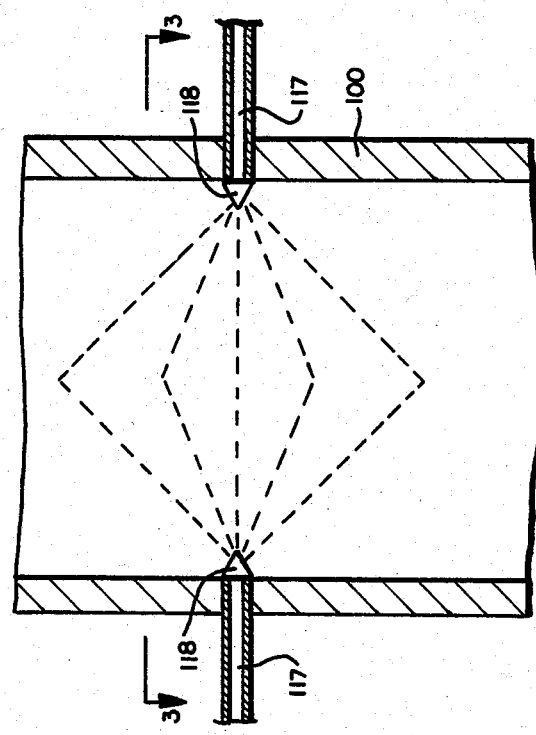
FIG. 2 is an alternative enlarged vertical section of another embodiment of the bottom quenching zone shown in FIG. 1.
Figure 3:
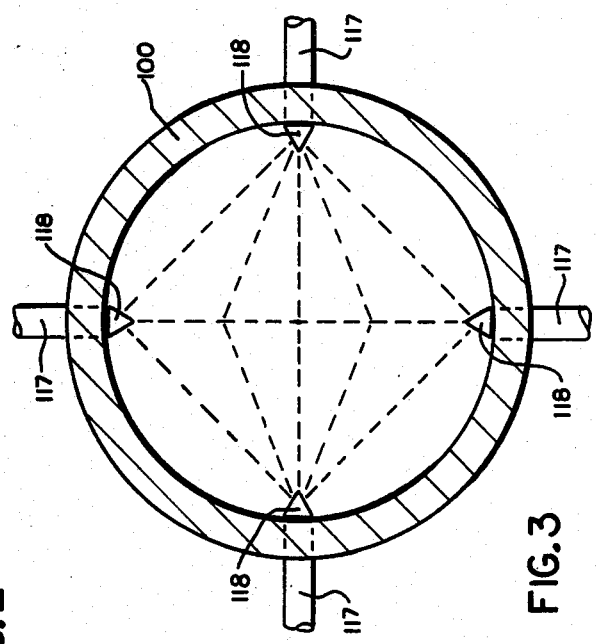
FIG. 3 is a horizontal cross section of the quenching zone taken at section lines 3—3 in FIG. 2.

Referring next to FIGS. 2 and 3, shown is an alternative laterally disposed quenching spray configuration comprising opposed horizontally directed nozzles 118 having impinging spray patterns as best viewed in the horizontal sectional view in FIG. 3. The nozzles 118 are fed by liquid inlet feed lines 117 passing through the refractory 100 and steel wall of the vertical sidewall of the reactor 14. The spray angle pattern can be between about 45° and 135° depending on the number of nozzles. Four nozzles 118 mounted equidistant are preferred although three nozzles 118 mounted peripherally equidistant in the vertical sidewalls are satisfactory. Two nozzles 118 are acceptable but less preferred.

Figure 4:
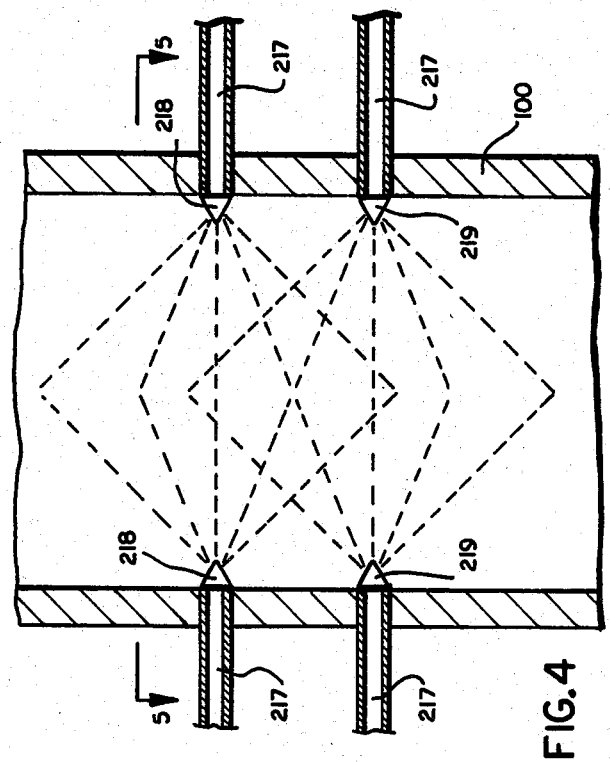
FIG. 4 is an alternative enlarged vertical section of another embodiment of the bottom quenching zone shown in FIG. 1.
Figure 5:
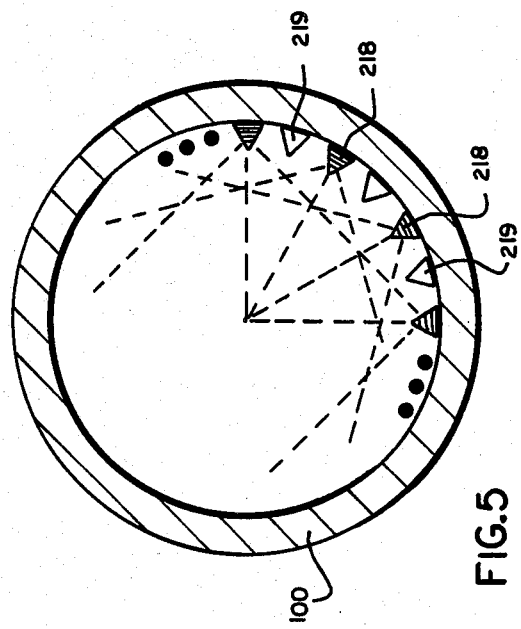
FIG. 5 is a horizontal cross-section of the quenching zone taken at section lines 5—5 in FIG. 4.

Referring next to FIGS. 4 and 5, shown is still another alternative configuration of horizontally disposed nozzles comprising a plurality of upper nozzles 218 and lower nozzles 219 vertically offset within the reactor. The number of upper nozzles 218 can range from two or more in combination with two or more lower nozzles 219 wherein a pair of upper nozzles 218 are diametrically opposed and a pair of lower nozzles 219 likewise are diametrically opposed. The upper pair 218 can be rotated 90° horizontally to provide inwardly directed nozzles in each quadrant. As shown in FIG. 5, wherein only one quadrant is illustrated, several upper and lower nozzles 218,219 can be mounted through the refractory sidewall 100. The spray angles can be adjusted within a wide range to accommodate and optimize impinging spray patterns depending on the number of nozzles 218, 219.

Figure 6:
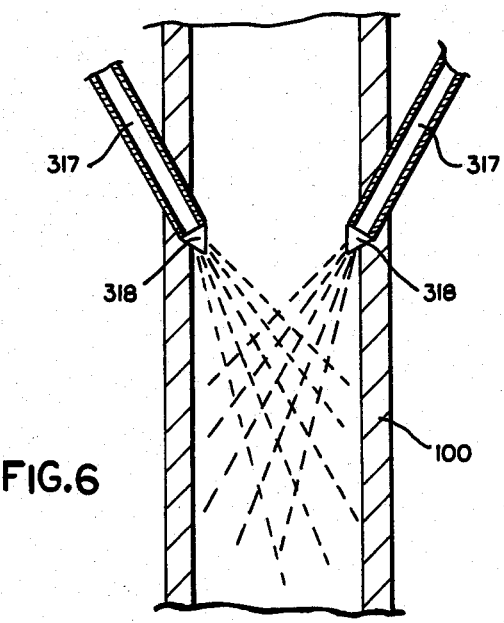
FIG. 6 is an alternative enlarged vertical section of another embodiment of the bottom quenching zone shown in FIG. 1.

Shown in FIG. 6 is still another alternative configuration of quenching nozzles comprising downwardly directed nozzles 318 adapted to cross spray as shown. In similar manner, upwardly directed sprays can be utilized. In either configuration, the plurality of nozzles comprise at least two, preferably at least three, and desirably four or more nozzles 318 preferably equally spaced peripherally, around the interior periphery of the reactor 15. The nozzles 318 are mounted through the refractory sidewall 100 and are fed liquid coolant under pressure by lines 17.

Figure 7:
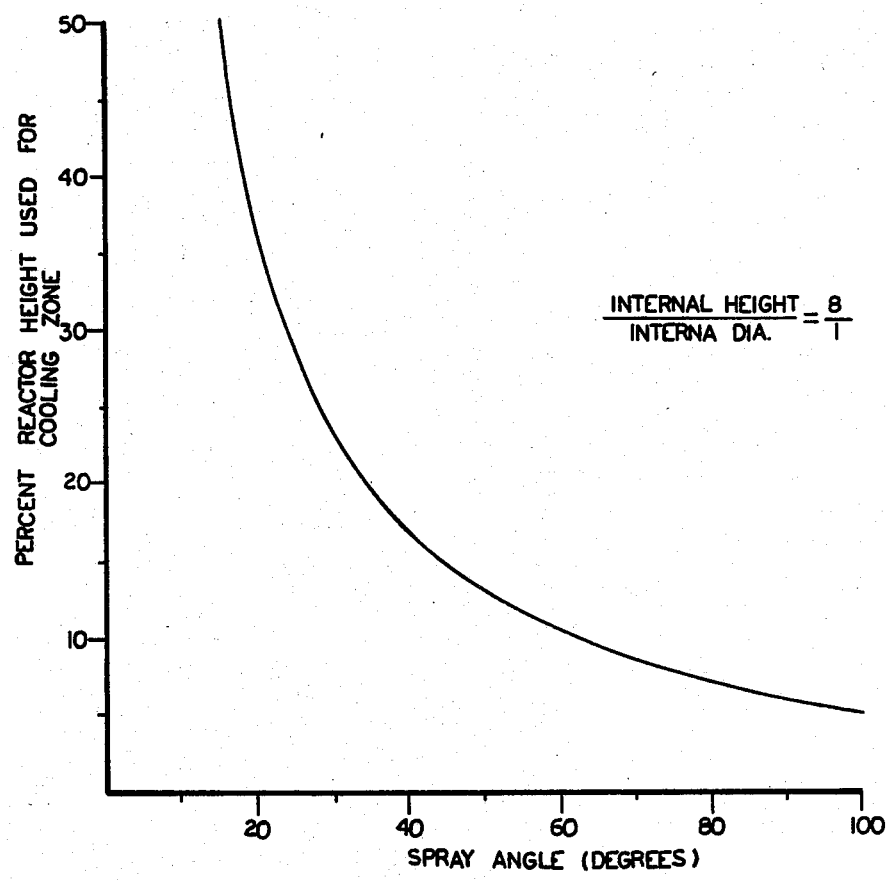
FIG. 7 is a graph illustrating the amount of reactor height used for the quenching zone as a function spray angles for a typical entrained-downflow chlorinator.

FIG. 7 illustrates the range of useful spray angles as a function of spray zone height for bottom mounted spray nozzles 18 shown in FIGS. 1 and 1a. The height of the cooling zone is dependent upon the spray angle.

In more detail, a highly desirable entrained-flow chlorinator (EFC) for commercial operation will typically be over 4 feet in inside diameter (ID) and have an inside height (IH) to inside diameter ratio (IH/ID) of 8/1. Other IH/ID values are, of course, useful. An EFC for large scale production would typically have an ID of about 7 feet and an IH of about 56 feet.

As shown in FIGS. 1a, 2-6, several useful cooling spray configurations for the cooling zone in the bottom of the EFC are illustrated. The spray pattern angle shown in FIG. 1a is 60°, but other spray angles can be used. Four nozzles are shown in FIG. 3, but a single nozzle would suffice, though it would be less efficient. Full cone spray patterns are preferred. Multiple nozzles arranged as shown in FIG. 4 can be used at one, two, or more horizontal levels.

The preferred cooling zone configuration is illustrated in FIG. 1a wherein the cooling spray is directed upward against the downward flow of hot gases leaving the chlorination zone. A single nozzle can be used, or multiple nozzles clustered near the center of the reactor floor can be used. In this configuration, the height of the cooling zone will have some dependence on the spray angle. For example, using an EFC with IH/ID equal to 8/1, the maximum percentage of reactor height used by the cooling zone is shown in FIG. 7 as a function of the quench spray pattern angle. For an EFC with an IH/ID of 8/1, a bottom spray angle would therefore be in the 25 to 65 degree range.

The fraction of reactor height required by the cooling zone depends for example on the chlorination zone temperature, mass flow rate and downward velocity of chlorination products, and the desired final temperature of the stream discharged from the EFC. For most applications 10-30% of the total inside height (IH) should be adequate for the quenching zone.

An advantage of the bottom spray in FIG. 1a over side sprays in FIGS. 2 through 5 is the opportunity to change the cooling zone height by changing the spray angle. Once side sprays are installed, the cooling zone height is fixed. Furthermore, the bottom nozzle is protected from the hot, corrosive environment of the chlorination zone.

A critical condition that must be met is that substantially all of the liquid spray droplets must not wet the walls of the chlorination zone or cooling zone, although wall wetting downstream of the cooling zone is tolerable. The droplets must be evaporated by the hot chlorination products before reaching the walls. Otherwise, the dusty solids in the gas stream, along with condensing or freezing metal chlorides, will collect on the wet cool walls. When reactor walls are not wetted by the liquid evaporative coolant, then, for typical chlorination conditions, the cooling chlorinator products are at essentially the same temperature as the walls over which they pass. If this important condition is maintained, then the condensing or freezing metal chlorides will not condense or freeze on walls since the walls are not colder than the passing chlorinated products. This critical condition may be more difficult to achieve in actual practice in relatively small diameter vessels. In general, the angle of a bottom spray will be smaller in smaller diameter vessels in order to achieve the dry wall condition.

In order to hold the height of the cooling zone with bottom spray to a minimum, a wide angle full cone spray is desirable, which requires that the liquid spray droplets evaporate faster to prevent wall wetting. The distance an evaporating liquid droplet will travel before complete vaporization depends strongly on droplet size. Small droplets are preferred. Smaller droplets are obtained when multiple lower capacity nozzles are used instead of a single higher capacity nozzle of the same tupe. Also, droplets decrease in size as the angle of the spray pattern is increased. Furthermore, the droplet size decreases as the pressure drops across the nozzle is increased. It is therefore preferred to use multiple nozzles operating at higher pressures and having as wide a full cone spray pattern as possible without wetting the wall. The configuration shown in FIG. 6 allows the wetted walls to be maintained in a position below the incoming spray and below the level at which the bulk of gas cooling is carried out.

Referring next to the chlorination process, the entrained-downflow chlorination process utilizes a reaction zone in an elongated chamber having an inlet for the particulate reactants and the chlorine-providing gas and an outlet for titanium chlorides and by-product materials, as described in U.S. Pat. No. 4,343,775. The particulate materials flow through the chamber by gas entrainment and by gravity, as in a downflow chamber, which is preferred for convenience and economy.

During the reaction process, the temperature within the chlorination reaction zone is maintained at greater than about 800° C. and advantageously greater than about 1000° C. According to the down-flow process powdered porous carbon and powdered oxide material are entrained in a stream of chlorine or chlorine-providing gas and introduced into the chlorinaton reaction zone wherein they proceed in a substantially downward path. Chlorine providing gas can include phosgene, $COCl_2$, organohalides, and $FeCl_3$ vapor which dissociates above 800° C. to $FeCl_2$ and $Cl_2$. The chlorination reaction temperature is maintained at a temperature from about 800° C. to about 1200° C. and the reaction zone is sufficiently long so that the falling carbon and oxide material experience a retention of between about 1 and 20 seconds within the chlorination reaction zone, typically 5 to 10 seconds.

The process of this invention is particularly useful for the chlorination of titaniferous materials. Titaniferous materials are often subjected to chlorination as chlorination is an efficient and economical way to obtain a high purity source of titanium for making titanium alloys, titanium compounds, and especially pigmentary titanium dioxide. Several processes have been described in the art for the chlorination of titaniferous materials. Such processes generally react a titanium-containing raw material such as rutile ore or ilmenite ore, with a chlorine-providing material and a carbon reductant at an elevated temperature according to one or both of the following equations:

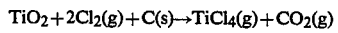

$$TiO_2 + 2Cl_2(g) + C(s) \rightarrow TiCl_4(g) + CO_2(g)$$

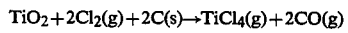

$$TiO_2 + 2Cl_2(g) + 2C(s) \rightarrow TiCl_4(g) + 2CO(g)$$

Conventional chlorination reactions are generally carried out at about 1000° C., but can be carried out at any temperature in the range from about 800° C. to about 2000° C., using various conventional carbon reductants and chlorine sources. In accordance with this invention, the entrained-flow chlorination of oxide materials, particularly titanifeorus materials as well as other oxide material ores can be combined with the quenching zone of this invention to avoid disruption of the process by undesirable liquid forming alkali or alkaline earth materials causing undesirable sticking or liquid flooding.

The merits of this invention are further illustrated by the following examples.

EXAMPLE 1

Chlorination of Titania Slag

An entrained-downflow chlorinator with a bottom cooling zone capable of chlorinating 52,000 stpy (short tons per year) of slag diagramatically in FIG. 1 and 1a. The slag contains the following:

80. wt. %: $TiO_2$
10. wt. %: FeO
1.1 wt. %: CaO
5.5 wt. % : MgO
Balance: mainly $SiO_2 + Al_2O_3$ The slag is milled together with a brown coal char having the following composition:

91.9 wt. %: Carbon
0.9 wt. %: Hydrogen
0.27 wt. %: Sulfur
0.41 wt. %: CaO
0.51 wt. %: MgO
0.14 wt. %: $Na_2O$
0.47 wt %: $Fe_2O_3$
0.51 wt. %: $SiO_2$ A mixture containing 30 wt. % char and 70 wt % slag is ball milled until about 50 wt % passes through a 325 mesh screen (45 micrometer openings).

Referring to FIG. 1, 289 lb/min of slag and 125 lb/min of char are introduced through line 11. Through line 12 are introduced 2810 scfm (standard cubic feed per minute, based on 1 atmosphere absolute pressure and 23° C.) of recycle gas from a $TiCl_4$ burner producing $TiO_2$ pigment, along with 520 scfm of make-up $Cl_2$. The mixed gas has the following compositions:

73.7 Vol. %; $Cl_2$
16.8 Vol. %: $N_2$
5.2 Vol. %: $O_2$
2.5 Vol. %: $CO_2$
1.8 Vol. %: HCl

The fine solids are dispered in the $Cl_2$-containing gas stream in line 13 and the dispersion is sprayed into the top of the entrained-flow chlorinator 14, which is a refractory-lined steel vesel with an ID of 7.7 ft and an IH of 58 ft. The refractory walls are 2.25 ft thick, and the domed top and dished bottom are refractory covered.

The chlorination reaction takes place in zone 15, which is maintained at about 1050° C. by the exothermic reaction. The chlorination products containing liquid $CaCl_2$ and $MgCl_2$ leave zone 15 and enter zone 16 where they are immediately rapidly cooled by pumping 122 gpm (gallons per minute) of unpurified liquid $TiCl_4$ through line 17 and then through nozzle 18. The spray angle leaving the nozzle is about 50°. Cooling zone 16 requires about 18% of the total inside height of the reactor.

Chlorination products exiting zone 16 at 200° C. are conveyed through line 19 to cyclone 20 where the following amount of solids in lb/min are separated from the gas stream through line 21.

46.: $FeCl_2$
5.3: $CaCl_2$
31.: $MgCl_2$
26.: slag
62.: char (Excess slag and char are used to assure complete reaction of $Cl_2$).

The gas stream leaving the cyclone through line 22 contains the following:
- 474 lb/min; newly produced $TiCl_4$
- 1765 lb/min: vaporized spray $TiCl_4$
- 949 scfm: $CO_2$
- 934 scfm: $CO$
- 560 scfm: $N_2$
- 312 scfm: $HCl$ Gaseous stream 22 is conveyed to conventional processing equipment where about 155 gpm of $TiCl_4$ is condensed and separated from the other gases. The HCl is then recovered from the remaining gas in a gas scrubber using an $HCl$—$H_2O$ scrubbing liquid.

Of the condensed $TiCl_4$, 32.8 gpm are purified for oxidation to yield 200 lb/min of $TiO_2$ pigment and 1930 scfm of $Cl_2$ which is recycled to the chlorinator. The remaining condensed $TiCl_4$, 122 gpm, is recycled in its unpurified state to spray nozzle 18.

EXAMPLE 2

Chlorination of a Low Grade Tin Ore

The same chlorinator used in the previous example is used to chlorinate a low grade tin ore such as from Cornwall, U.K. The ore analyses
- 17% $SnO_2$
- 31% $SiO_2$
- 21.8% $Fe_2O_3$
- 9.75% $Al_2O_3$
- 4.7% S
- 1.7% $TiO_2$
- 1.6% CaO
- 2.2% MgO
- 0.6% $WO_3$
- 1% Zn, K, MnO
- 9% Moisture The ore was fine, about 40 micrometers average diameter in size (mean).

The ore was roasted at 900° C. to remove moisture and sulphur as far as possible, at which temperature it sinters. The ore was cooled and ground with the char in the proportions 30% char, 70% ore w/w to the same size specification as in the previous example.

The mixture of ore and char was fed at the rate of 1165 lb/min. to the reactor through line 11. Through line 12 is fed 2850 scfm (standard cubic feet per minute based on 1 atmosphere absolute pressure at 23° C.) of 90% $Cl_2$ 10% $N_2$ mixture being essentially pure $Cl_2$ from a source of vaporized liquid $Cl_2$ plus incidental nitrogen purgings. The two streams enter via line 13 into the unit 14. Oxygen is used as needed to control heat release in 14.

The procedure of the previous example is adhered to except that the spray liquid in this case is crude $SnCl_4$, the quantity involved being 120–130 gpm.

Cyclone 20 removes the following solids:
- 22.5 lb/min. excess ore
- 57 lb/min. excess char
- 295 lb/min. $SiO_2$
- 87 lb/min $Al_2O_3$
- 324 lb/min $FeCl_2$
- 29 lb/min. $CaCl_2$
- 48.5 lb/min. $MgCl_2$
- 4 lb/min. of $WOCl_3$, $MnCl_2$, and other impurity chlorides.

The gas stream leaving the cyclone via line 22 contains
- 267.6 lb/min. newly produced $SnCl_4$
- 2330 lb/min. vaporized sprayed $SnCl_4$
- 25.5 lb/min. $SiCl_4$
- 38.8 lb/min. $TiCl_4$
- 10.5 lb/min. $AlCl_3$
- 6 lb/min. of $WOCl_3$, $MnCl_2$, and other impurity chlorides
- 285 scfm $N_2$
- 3720 scfm Carbon Oxides
- 90 scfm HCl The $SnCl_4$ is condensed, 120–130 gpm is recycled for spray cooling, and the remainder is distilled to recover pure $SnCl_4$.

The unwanted chlorides and gases escaping the condenser are fed to an HCl scrubber where they are recovered as HCl.

We claim:

1. A process for chlorinating metalliferous ores containing oxide materials including alkali or alkaline earth materials, the process comprising:
   providing a downflow chlorinator having an upper chlorinating zone and a lower quenching zone;
   introducing a feed stream into said chlorinator for downward flow, said feed sream comprising metal oxide materials, carbon materials, and a chlorine gas source;
   chlorinating said metal oxide materials within the chlorinating zone in an entrained-downflow chlorination reactor in the presence of carbon at temperatures above about 800° C. to substantially chlorinate said metal oxide materials including the alkali or alkaline earth materials to produce down-flowing chlorinated products including alkali or alkaline earth chlorides;
   quenching the down-flowing chlorinated products within a lower quenching zone with a cooling fluid being sprayed into the downflowing chlorinated products to produce quenched chlorinated products including solid alkali or alkaline earth chlorides, said chlorinated products entering said quenching zone being quenched by liquid cooling spray in the quenching zone, said liquid cooling spray evaporated by contact with said chlorinated products before reaching the walls of said quenching zone to prevent said chlorinated products from collecting on the said walls; and
   removing the solid alkali and alkaline earth chlorides from the chlorinated products.

2. The process of claim 1 where the ore contains more than 0.3% by weight alkali metal oxide or alkaline earth oxides.

3. The process in claim 1 wherein the ore contains alkali metal oxide.

4. The process in claim 1 wherein the ore contains alkaline earth oxide.

5. The process in claim 1 wherein the cooling fluid is a liquid.

6. The process in claim 1 wherein the cooling fluid is vaporous.

7. The process in claim 1 wherein said ore is chlorinated with a chlorineproviding gas selected from phosgene, an organohalide, a $FeCl_3$ vapor, or chlorine.

8. The process in claim 1 wherein said ore is chlorinated by $FeCl_3$ vapor which dissociates above 800° C. to $FeCl_2$ and $Cl_2$.

9. The process in claim 1 wherein the quenched chlorinated products include gaseous chlorinated products, and a portion of said gaseous chlorinated products are recycled to provide cooling fluid to the quenching step.

10. The process in claim 1 wherein the quenching is by upwardly directed sprays of cooling fluid.

11. The process in claim 10 wherein the upwardly directed sprays comprise a plurality of sprays.

12. The process in claim 10 wherein the upwardly directed sprays are from spray means mounted on the reactor sidewall.

13. The process in claim 1 wherein quenching is by laterally directed sprays of cooling fluid.

14. The process in claim 1 wherein quenching is by horizontally disposed sprays of cooling fluid.

15. The process in claim 1 wherein quenching is by bilevel horizontally disposed sprays of cooling fluid.

16. The process in claim 1 wherein the ore predominantly comprises an alkali metal oxide.

17. The process in claim 1 wherein the ore predominantly comprises an alkaline earth oxide.

18. The process in claim 1 wherein substantially none of the fluid sprays wet the walls of the reactor.

19. The process in claim 1 wherein substantially none of the alkali or alkaline earth chlorides condense on the reactor sidewalls.

* * * * *